Jan. 29, 1935. R. J. STEVENS 1,989,630
ELECTRICAL SIGNALING AND CONTROL SYSTEM
Filed April 4, 1931 5 Sheets-Sheet 1

INVENTOR
Ronald J. Stevens,
BY
ATTORNEY

Jan. 29, 1935.   R. J. STEVENS   1,989,630
ELECTRICAL SIGNALING AND CONTROL SYSTEM
Filed April 4, 1931   5 Sheets-Sheet 2
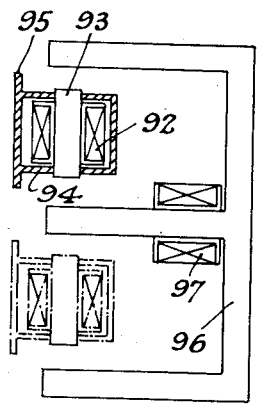
FIG. 8.
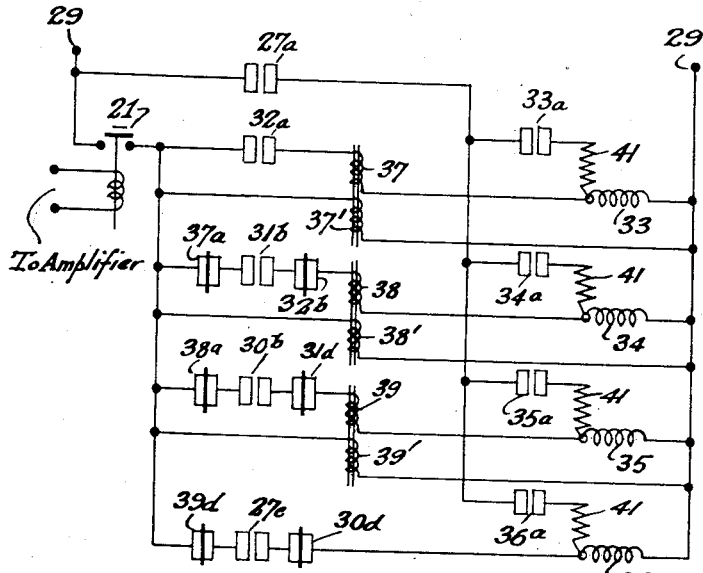
FIG. 3.
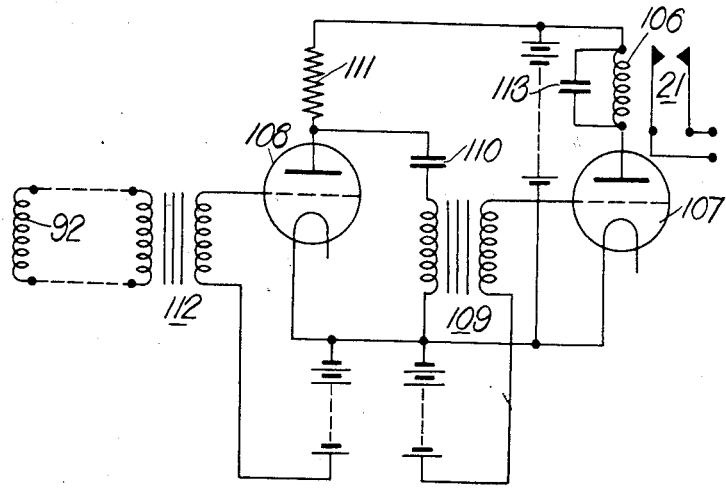
FIG. 9.
INVENTOR
Ronald J. Stevens
BY 
ATTORNEY

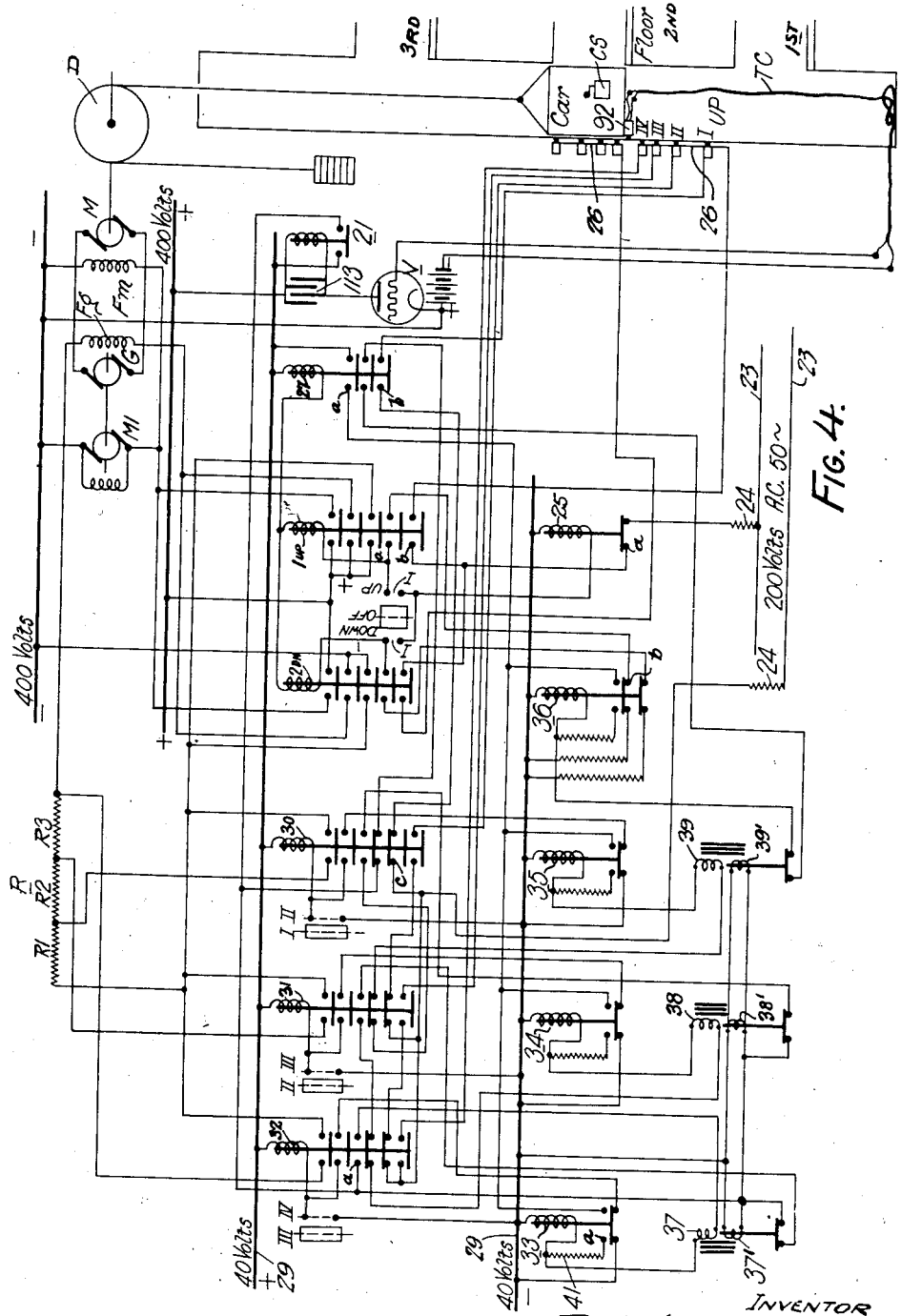

Patented Jan. 29, 1935

1,989,630

UNITED STATES PATENT OFFICE 1,989,630

ELECTRICAL SIGNALING AND CONTROL SYSTEM

Ronald John Stevens, New Malden, England, assignor to The General Electric Company Limited, London, England Application April 4, 1931, Serial No. 527,798
In Great Britain May 13, 1930

10 Claims. (Cl. 187—29)

This invention relates to electrical signaling and control systems more particularly for use on or in connection with apparatus in motion such, for example, as electrically operated or controlled lifts and railway trains, or reciprocating apparatus such as planing machines.

According to the invention in an electric signaling or control system of the kind specified a plurality of predetermined different operations of the signaling or control apparatus proper is adapted to be effected successively in respective different relative positions of said objects or apparatus by means of a relay or relay system the operation of which is governed by alternating, pulsating or otherwise varying currents obtained by reason of the relative motion and/or position of the objects or apparatus in one or more magnetic "pick-up" windings by induction from a plurality of controlling electromagnets or "inducers" adapted to be excited by alternating or similarly varying current. The controlling electromagnets or "inducers" may be selectively excited in accordance with the different signaling or control operations desired and such selective excitation of the one or more controlling electromagnets or "inducers" may be effected manually or automatically as will hereinafter appear. The relative speed of said objects or apparatus may be automatically varied in a predetermined manner, for instance reduced to zero, by the selective excitation of the controlling electromagnets in accordance with the relative speed and/or position of the objects or apparatus. The relative speed of the objects or apparatus may be automatically reduced to zero at a predetermined relative position of said objects or apparatus. The speed control apparatus may be interlocked electrically or otherwise with means which effect the selective excitation of the control electro-magnets.

The condition of the speed control apparatus may be varied manually and the manual control replaced by the automatic speed control as governed by the selective excitation of the controlling electromagnets.

The invention also includes an electric control system as set forth, for a lift, planer or like reciprocating object the speed of which can be varied between zero and maximum by speed control circuits associated with the electric driving motor or other prime mover, wherein the speed variation is effected automatically by a plurality of successive operations of a relay or relay system supplied with a series of alternating, oscillating, pulsating or otherwise varying currents successively obtained by reason of the movement of the lift or like reciprocating object in one or more magnetic "pick-up" windings by induction from a plurality of controlling electromagnets energized with current and preferably with low frequency alternating current. They may be selectively energized in accordance with the speed of the lift or like reciprocating object as determined by the condition of the speed control gear.

The invention includes an electric control system as set forth more particularly for a lift, comprising the combination with control apparatus governing the speed of the lift and manual means for at least starting the lift in motion, of a relay or relay system, a circuit system arranged by successive operation of said relay or relay system to bring the lift to rest, a plurality of controlling electromagnets fixed in predetermined different positions on the lift or along the lift shaft, means for electrically exciting said electromagnets when the lift is in motion, and one or more magnetic "pick-up" windings connected with said relay or relay system and adapted to be excited by induction from said controlling electromagnets in succession by reason of the movements of the lift so as to bring the latter automatically to rest at a floor or landing. The system may be provided with manually controlled means for precluding the operation of the means for bringing the lift automatically to rest, and with means for selectively exciting the controlling electromagnets so that only those will be excited as are necessary to bring the lift to rest exactly at a floor or landing.

The current induced in the pick-up coil from the controlling electromagnets is preferably amplified and/or rectified before being fed to the relay, by means of one or more thermionic valves such as triodes having such a high biassing potential that not only does no current normally pass through said valve or valves but an applied operating voltage is necessary which is greater than any stray or transient voltages likely to be picked up in the circuits. The amplifying or rectifying valves may operate directly by an electro-mechanical relay, the coil of which is connected in the anode circuit of the last of the amplifying or rectifying valves the grid circuit of such last valve being conveniently coupled with the preceding valve by means of a usual type of intervalve coupling such as a low frequency transformer.

The invention also includes an electric signaling or control system for use on or in connection with objects or apparatus in relative motion, comprising the combination with electrical signaling or control apparatus, of a relay or relay system governing the operation of said signaling or control apparatus, one or more controlling electromagnets adapted to be energized with alternating, pulsating or otherwise varying current, one or more pick-up windings adapted to be excited from said one or more controlling electromagnets during the relative motion of said objects or apparatus, and a thermionic amplifier connecting said one or more pick-up windings with said relay or relay system which thermionic amplifier, for the purpose set forth, has a higher grid bias potential than is necessary normally to prevent the flow of anode current.

The invention also comprises further features hereinafter described and claimed.

To enable the invention to be clearly understood it will now be described by way of example with reference to the accompanying drawings in which:

Fig. 1 is a diagram in simplified conventional form well understood by electric lift engineers, of the selective energizing circuits of the control electromagnets of a simple lift control system.

Fig. 2 is a simplified diagram of the circuits of a manual controller co-operating with the circuits illustrated by Fig. 1 and Fig. 3 is a diagram of a system of sequence switches co-oprating with the circuits illustrated by Figs. 1 and 2, whilst, Fig. 4 is a substantially complete schematic diagram combining the circuits shown in Figures 1, 2 and 3 as applied in a complete but elementary manner to a lift control system by way of example and in accordance with the present invention.

Fig. 8 is a sectional plan view of the controlling and "pick-up" electromagnets by way of example which may be used in systems according to the invention, and Fig. 9 is a circuit diagram of a relay and thermionic amplifier which is preferably used in systems according to the invention.

Referring first to Figs. 1, 2, 3 and 4, the lift control system illustrated thereby is adapted to cause a lift to be started in either direction under manual control and accelerated through a plurality of distinct speed stages and then automatically decelerated through distinct speed stages and brought to rest at any desired floor or landing. In the example given there are three floors indicated 1st floor, 2nd floor and 3rd floor, respectively and the lift is adapted to travel at four speeds. The system is such the lift can be caused under manual control to travel at any one of several speeds less than the maximum and none the less be automatically decelerated appropriately to bring the lift to rest at a floor or landing.

Figure 1:
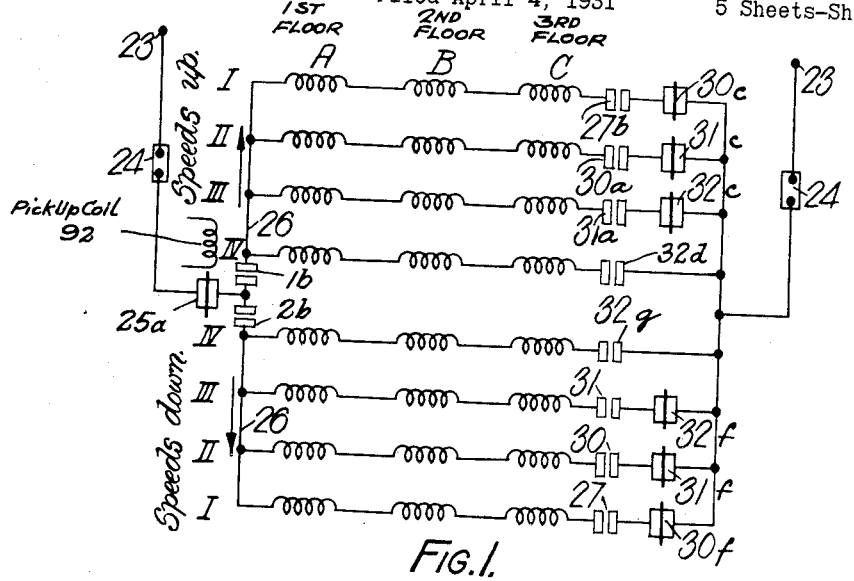
Figure 2:
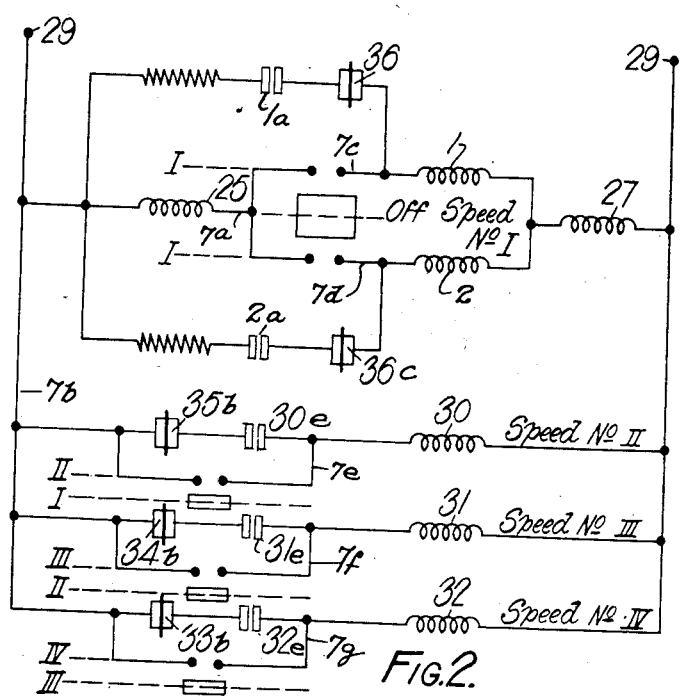

In Figs. 1, 2 and 3 the operating coils of electromagnetically controlled or operated switches are indicated by helices as are also the controlling electromagnets whilst such switch contacts themselves are indicated by pairs of spaced rectangles when the switches are normally open and by rectangles with strokes through them when the switch contacts are normally closed; the switch contacts of the manual controller are indicated by pairs of dots with adjacent rectangles whilst the controller positions or notches are represented in a manner well understood by motor control engineers, by dotted lines and Roman figures.

In Fig. 1 are shown the coils of twenty-four controlling electromagnets or "inducers" which are fixed in appropriate positions in the lift shaft and adapted to be selectively energized in series-connected groups of three from alternating current supply mains 23 through suitable current limiting resistances or condensers 24 and also through normally closed switch contacts 25a of switch 25 on the left hand side, through alternatively operable normally open "up" and "down" switches 1b and 2b respectively to busbars 26 and through a group of selecting switches 30c to 32c and 30f to 32f shown on the right hand side of Fig. 1.

With regard to the inducers for the three floors, there are four groups of three series connected coils for each direction of travel, namely three coils A, B and C corresponding to maximum speed indicated by IV and similarly three coils A, B and C corresponding to each of the lower speeds III, II and I. The inducers are fixed in groups with respect to each floor or landing in such position with respect to the pick-up coil on the lift and to one another that the lift will be automatically decelerated smoothly and brought to rest exactly at a floor or landing. Thus the group for the 1st floor will comprise inducers IVA, IIIA, IIA and IA and a similar group for the opposite direction of travel of the lift.

In Figure 4 the arrangement of the circuits shown in Figure 1 are diagrammatically indicated in their relationship with respect to the electromagnetically controlled switches and the manual controller switches, however the inducers at the 2d floor only are shown. By way of example a complete circuit through Up inducer I, is from one line of the power supply, 23, through current limiting resistance or condenser 24, thence to normally closed contacts of switch 25, thence to normally open lower contacts 1b of the electromagnetically operated up direction switch 1, thence to bus bar 26 to which inducer I is connected, thence to lower open contacts 27a of switch 27, thence to normally closed contacts 30c of electromagnetically operated control switch 30, thence to a corresponding current limiting resistance or condenser 24 connected with the other line of the power supply 23. The circuits through each of the other inducers at floor B in Figure 4 are similarly traceable and their energization is dependent upon the closure of the switches of the manual controller corresponding to positions I, II, III, IV and the corresponding direction switches which will be referred to presently.

In Figs. 1, 2, 3 and 4, switches and their respective operating coils are given the same reference numerals where possible.

Referring now to Fig. 2 which shows the circuits directly related to the manual controller, the latter has four operative positions I, II, III and IV on each side of an "off" position wherein all the controller circuits are open. Movement of the controller from "off" in one direction effects upward travel of the lift and in the other direction effects downward travel of the lift. When the controller is moved from "off" to the first notch I, coil of switch 25, coil of switch 27 and one or other of coils of switches 1 up and 2 down are connected to a source of alternating or direct current 29. The operating coils of switches 1 up and 2 down when energized operate to close contacts of these switches (shown in Figure 4) which cause the lift motor to run at the slowest speed and when de-energized cause the lift to stop. Further movement of the controller in either direction effects successively the energization of the coils of switches 30, 31, and 32 which effect changes in the main motor control gear (shown in Fig. 4) causing the lift to travel at speeds II, III and IV respectively.

The energization of the operating coil of switch 30 also effects the closure of the normally open contacts 30a and 30b of switch 30 in Figs. 1 and 3, respectively, and the opening of the normally closed switches 30c and 30d in Figs. 1 and 3 respectively, and the closure of switch 30c bridging the controller contacts in position or notch II thereof to provide a holding circuit for the coil 30 when the controller is returned to the "off" position.

Further movement of the controller to position III effects the energization of the operating coil of switch 31 which in addition to causing the lift to travel at speed III, effects the closure of maintaining contacts 31c of switch 31 (Fig. 2), of selecting contacts 31a of switch 31 in Fig. 1 and of contacts 31b of switch 31 in Fig. 3 and also effects the opening of normally closed selecting contacts 31c of switch 31 in Fig. 1.

Movement of the controller to position IV effects the energization of the operating coil of switch 32 causing the lift to run at full speed and effecting the closure of maintaining contacts 32c of switch 32 (Fig. 2) and of selecting contacts 32a of switch 32 (Fig. 1) and of contacts 32a of switch 32 (Fig. 3) and the opening of selecting contacts 32c of switch 32 (Fig. 1) and of contacts 32b of switch 32 (Fig. 3).

The circuits shown in Figure 2 are all included in the composite diagram of the control system, Figure 4. By way of example the circuit closed by bridging the Up contacts, position I Up of the controller is as follows,—from one line of the power supply 29, through the operating coil of switch 25 to the contacts I Up of the controller through the operating coil of switch 1, thence through the operating coil of switch 27 which is connected with the other line of the power supply 29; the other circuits shown in Figure 2 are traceable in a similar manner in Figure 4.

Referring next to Fig. 3, which shows switches for the automatic operation of the system, coils of switches 33, 34, 35 and 36 also designated by these numerals are adapted to be successively energized as the pick-up winding on the lift passes in succession the controlling electromagnets IV, III, II and I at any of the floors. The coils of switches 37, 38 and 39 are respectively connected in series with coils of switches 33, 34 and 35 and are thus energized simultaneously therewith. Said coils of switches 37, 38 and 39 are wound on the same cores as are auxiliary coils 37', 38' and 39' which are all connected to the source 29 of direct current supply whenever the relay 21 operates. The common cores of the coils 37, 37'; 38, 38'; and 39, 39' when energized by the pairs of coils open the switches 37, 38 and 39 respectively, the fields due to the windings 37', 38' and 39' alone being insufficient to open said switches. The circuits shown in Figure 3 are all included in the diagram Figure 4 and are readily traceable in this diagram. By way of example the circuit through the coil of switch 33 is shown from one line of the power supply 29 to upper open contacts 27a of switch 27 thence to the upper open contacts 33a of switch 33, resistance 41 associated therewith, operating coil of switch 33 to the other line of the power supply 29; also from said first line to open contacts of switch 21 thence to open contacts 32a of control switch 32, thence through operating coil 37 of switch 37 coil 33 to the second line of the power supply 29. Simultaneously with the closing of contacts of switch 21 the circuit of auxiliary coil 37' of switch 37 is completed across this power supply 29 being a direct circuit from one line through these contacts of switch 21, thence through coil 37' of switch 37 and to the other line of the power supply; the auxiliary coils of switches 38 and 39 being in parallel with coil 37', as shown in Figure 4, are simultaneously energized when the circuit for coil 37' is closed. The remaining circuits shown in Figure 3 are traceable on Figure 4 in a similar manner; in order to avoid confusion, connecting conductors on this diagram have not been denoted by reference numerals.

The energization of coils 33—36 effects respectively the closure of maintaining contacts 33a to 36a adapted to connect said coils 33—36 to the source 29 through suitable resistances 41 and through the switch 27 which is closed whenever the lift is in operation. The coils 33—35 (Fig. 3) when energized open normally closed contacts 33b to 35b (Fig. 2) respectively so that the successive energization of said coils 33—35 effects the de-energization of main motor speed controlling coils 32, 31 and 30 (Fig. 2) to cause the lift to slow down to the lowest speed I, whilst finally the energization of coil 36 (Fig. 3) effects the opening of normally closed maintaining circuit contacts 36b (Fig. 2) to cause the lift to stop by the resulting de-energization of coils 25, 28 and 27.

Referring further to Fig. 3, the successive energization of coils 37—39 and 33—36 is under the control of a group of switches 27c, 30b, 31b, 32a, 37a, 38a and 39a respectively which operate in such manner that when the pick-up coil on the lift has passed beyond the field of any particular inducer the circuit for energizing coil 34 or 35 or 36 (Fig. 3), whichever is required to be next energized for effecting a further retardation step, is not available until the relay 21 has opened and the pick-up coil has passed out of the influence of a controlling electromagnet which has effected a retardation step. It will be noticed that the controlling electromagnets to be excited are selected by the direction of travel and the speed of the lift and that any particular controlling electromagnet can only have one function even in the case when the lift has been caused to travel (by operation of the controller) and is traveling at a speed less than the maximum. The controller must be returned to the "off" position before the automatic retardation becomes effective, so that it is thus possible to cause the lift to pass a floor, namely by holding the controller on one of the operative or speed notches.

In the substantially complete schematic diagram of Fig. 4 the car is shown driven by the hoisting drum D operated by the motor M of a Ward Leonard set which includes a constant speed motor M1 driving a generator G. The hauling motor M has a constantly excited field winding FM. The generator G has a field winding Fg which is adapted to be reversed and also to be variably excited in both senses through the resistance R namely in four distinct stages in which, I the whole of the resistance R is inserted, giving the slow or creeping speed, II when the left hand section R1 is short circuited, III when the two sections R1 and R2 are short circuited, and IV when all three sections R1, R2 and R3 of the resistance R are short circuited. The speed control of the lift is obtained in any well known manner. Thus for the sake of simplicity, in Fig. 4, it is shown as being effected by the switches 30, 31 and 32, which perform however the numerous other functions herein set forth. In practice such other functions would usually be performed by other switches, the operating coils of which could be connected in parallel with the operating coils of the switches 30, 31 and 32.

In Fig. 4 only the up-group of inducers is shown connected in order to avoid too many lines upon the diagram. It will be fully apparent however from Fig. 1 and the description thereof that the group of up-switches for each speed at each floor are connected in series with one another whilst the groups of down-inducers will be connected similarly.

It is impracticable to illustrate the controller actually within the car in Fig. 4 so that only the car switch CS is symbolically illustrated therein. It will readily be understood that in a trailing cable from the car switch down the lift shaft to the control room seven conductors will be sufficient for the circuit connecting the manual controller switches with the control system; by referring to Figure 2 the conductors which correspond to this cable are designated 7a, 7b, 7c, 7d, 7e, 7f and 7g.

The inducer 92 in an appropriate casing is shown mounted beneath the car and connected by the two wire trailing cable TC to the amplifier rectifier V which will be hereinafter described in detail, namely with reference to Fig. 9.

Referring to the diagram Figure 4, and Figures 1, 2 and 3, as particularly pointed out, the complete sequence of operations will now be described assuming the lift to be travelling in the "up" direction by moving the controller gradually from the "off" position to the fourth notch so as to energize successively the operating coils of switches 1, 30, 31 and 32 (Fig. 2). The coils of switches 25 and 27 are also excited so that by the opening of the contacts of switch 25 after passing controller notch I the circuit shown separated in Fig. 1 for those skilled in the art is de-energized, by the opening of contacts 25a of relay switch 25 whilst maintaining circuits are established for coils of switches 1, 27, 30, 31 and 32, and assuming also that the controller is moved to the "off" position said latter switch coils remain energized and contacts of switch 25 close again and since contacts of switches 1 and 32 are closed and normally closed contacts of switches 30, 31 and 32 (Fig. 1) are now open the group IV. A. B. C. of up-direction controlling electromagnets (and only this group) associated with the three floors will be excited with alternating current, one of these inducers being the first to receive into its field and influence the pick up winding 92 on the lift. When the pick up winding is so influenced, relay 21 being connected thereto through the amplifier, operates and since the contacts 27a and 32a of switches 27 and 32 (Fig. 3) are closed at this time, the operating coils 37 and 35 become energized so that contacts 33a of switch 33 close to provide a maintaining circuit for coil 33 and the normally closed contacts 33b of switch 33 (Fig. 2) opens to remove the bridging circuit from the controller contacts of notch IV, whereby the main motor speed controlling coil of switch 32 becomes de-energized and the lift slows down to speed III. The energization of coil 37 (Fig. 3) as above mentioned, causes switch 37 to open its contacts 37a and to hold them open until the pick-up coil passes out of the influence of one of the controlling electromagnets IV A or B or C, according to which floor the lift is approaching, when relay 21 opens so that the coil of switch 37 becomes de-energized whilst 33 remains energized through contacts 33a and 27a switches 33 and 27. The de-energization of the operating coil of switch 32 (Fig. 2) had already opened the contacts 32a of switch 32 (Fig. 3) to de-energize coil 37, but the coil 37 had remained energized for sufficient time to hold switch 37 open namely until relay 21 opened; coil 37' provides sufficient field for maintaining switch 37 open even when coil 37 is de-energized, but provides insufficient field for itself to close switch 37. Thus the retardation progression is held up until the pick-up winding comes under the influence of the next controlling electromagnet namely one in the group III A B C which group becomes energized and the group IV A B C de-energized as soon as the lift retardation step has taken place by de-energization of coil of switch 32 (Fig. 2).

With the lift now moving at speed No. III, the pick-up winding becomes next influenced by one of the group III A B C of controlling electromagnets, and the retardation of the lift continues in like manner until the latter is finally brought to rest exactly at the floor or landing by the final de-energization of the operating coil of switch up switch 1 As previously stated, when it is desired to pass a floor or landing, it is merely necessary to hold the controller in one of its operative positions. It is impossible to effect retardation and stopping of the lift by manual control so that the system precludes the possibility of too rapid retardation and bad "levelling". Too rapid acceleration can be prevented by the provision of current limit relays or other means well known to those skilled in the art of electric motor control.

It will be understood that the operations obtainable in the system described with reference to Fig. 3 can be obtained by auxiliary control circuits other than those shown in said figures.

Figures 5, 6:
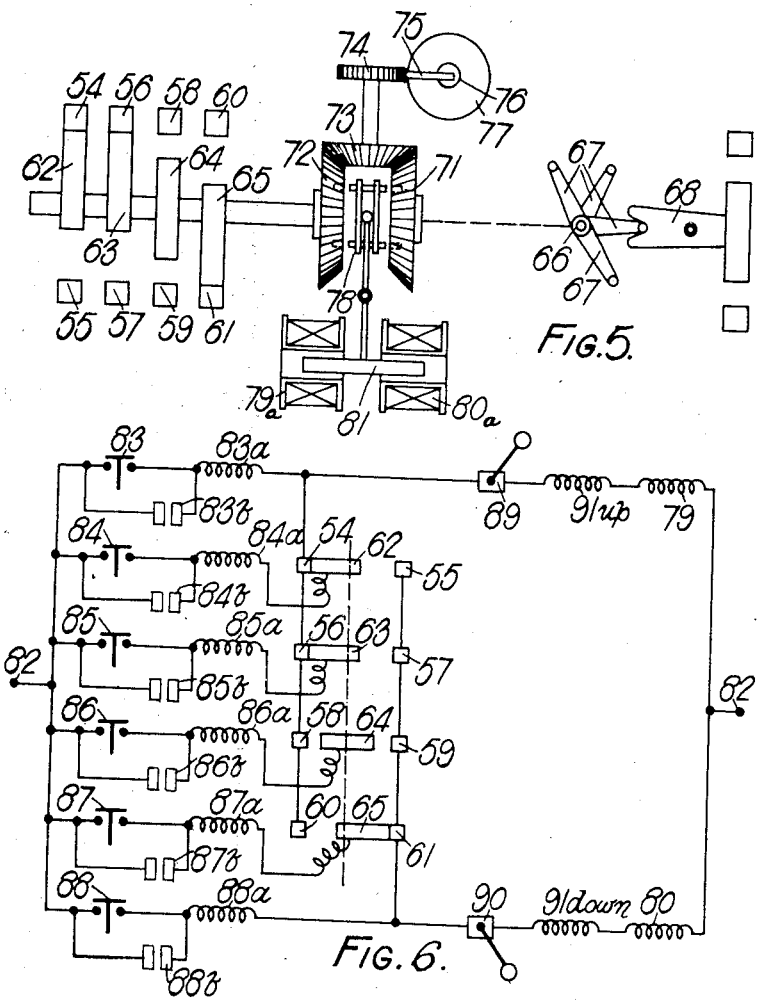
Fig. 5 is a diagrammatic view of an apparatus which can be employed for the purpose of selecting the direction of travel of a lift operating in accordance with the invention and for causing it to stop automatically at a preselected floor or landing and Fig. 6 is a circuit arrangement involving the floor-selecting apparatus shown in Fig. 5.

Referring now to Figs. 5 and 6, the floor selecting apparatus therein illustrated comprises in general a group of pairs of contacts 54, 55; 56, 57; 58, 59 and 60, 61, namely one pair for each floor or landing intermediate between the topmost and lowermost floors. In the present example there are six floors and thus four pairs of such contacts which may be fixed, and co-operating with said contacts are four movable contactors 62, 63, 64 and 65 each adapted to engage alternately one or other of a pair of the fixed contacts and also to occupy an intermediate open position after each engagement with a fixed contact.

The contacts 62—65 are adapted to be moved by four cam levers 67 fixed on a shaft 66 and co-operating with cams 68 attached severally to the contacts 62, 63, 64, 65. Said levers are so constructed and proportioned that one of them engages say the contact 62 when the latter is in engagement with contact 54, and moves it successively to the mid position and then to engage contact 55, the cam lever being then free to rotate clear of the contact and to re-engage it in the opposite direction of rotation of the shaft 66.

The shaft 66 is given intermittent rotation, in one direction or the other corresponding to the direction of travel of the lift for instance by means of bevel wheels 71 and 72 revolving freely on the shaft 66 and driven by the co-acting bevel wheel 73 which is given an intermittent partial revolution by means of a ratchet wheel 74 and pawl 75, operated by a plunger 76 and solenoid 77. This solenoid is caused to be excited by means of two sets of selectively energized inducers for up and down running respectively and the pick-up winding and relay system as previously herein described. The revolution of the wheel 73 is constant in direction and thus imparts opposite rotation to each of the bevels 71 and 72, but a pin clutch 78 is designed to engage alternately with the driven bevels 71 and 72, and is fitted upon a sliding key to the shaft 66 so that the latter is given a rotation dependent in magnitude on the action of the bevel wheel 73, driven by the pawl and ratchet mechanism, but differing in direction as the pin clutch 78 alternately engages bevel wheels 71 or 72. The engagement of the pin clutch 78 is determined by the action of coils 79 and 80 acting alternately on the double-ended plunger 81.

Figure 7:
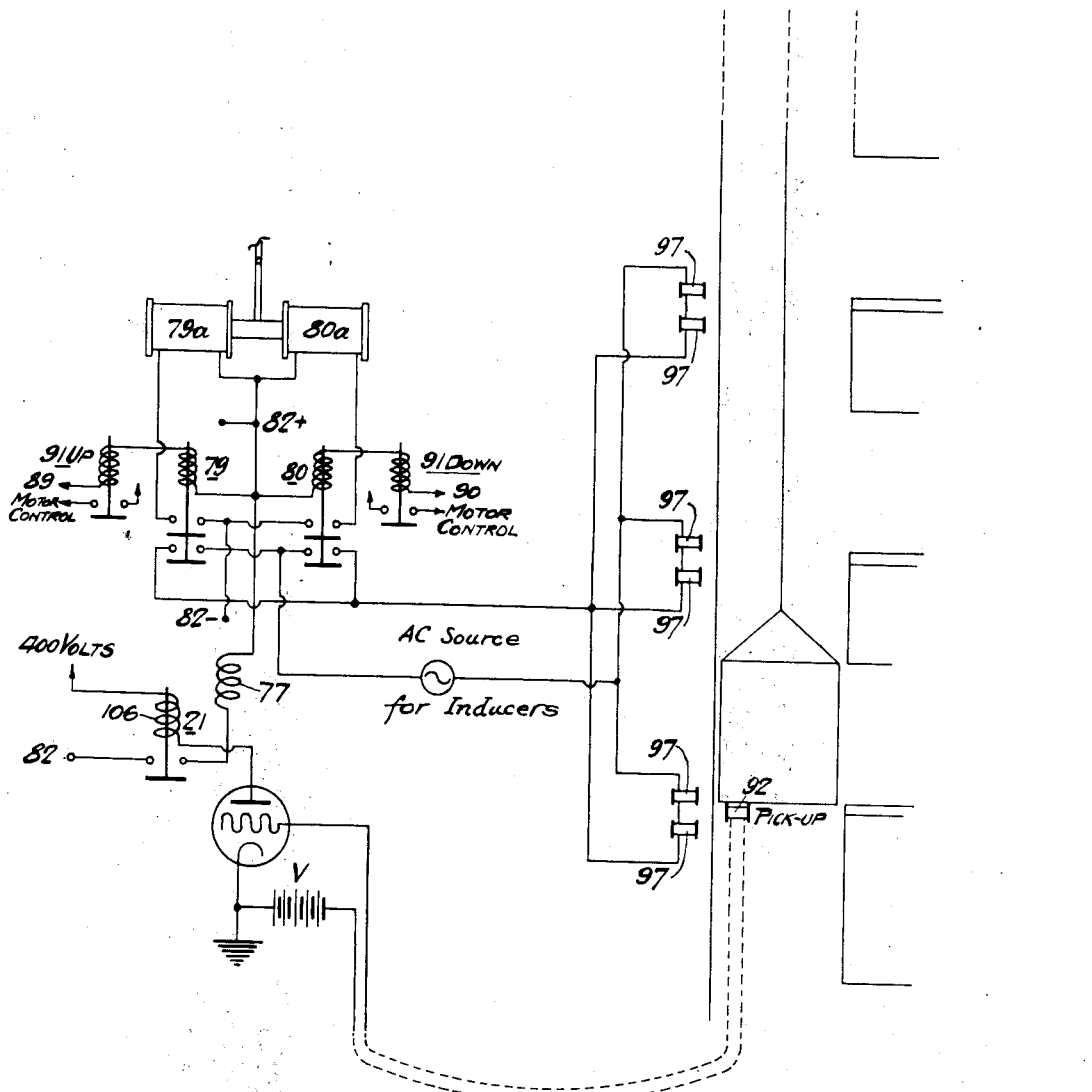
Fig. 7 is a diagram showing the manner in which the circuits of Figs. 5 and 6 are combined.

The floor selecting apparatus shown in Fig. 5 is connected in the circuit shown by way of example in Figs. 6 and 7. Energized controlling inducers 97 are arranged one on each side of each intermediate floor all the up inducers being connected in parallel and all the down inducers being similarly connected.

Referring to Fig. 6, 82 represents a source of control current of suitable voltage and 83—88 are push-buttons, of which there is one for each floor served. The momentary pressure of one of these buttons is adapted to cause the lift to commence to travel towards the associated floor and to stop at that floor in the manner to be described. Coils 83a—88a are provided which on energization, by closure of the respective push-buttons, close respectively switches 83b—88b.

Limit switches 89 and 90 are adapted to be positively opened by the lift at its extremities of travel. Coils 91 up and 91 down are provided which on being alternately energized cause main control circuits to be closed to cause the lift to move in one direction or the other. The alternative circuits include the switch coils 79 and 80 arranged as shown in Fig. 7 respectively to energize the solenoids 79a and 80a of the floor selecting switch (Fig. 6).

With coil 79 energized the contacts 62—65 are successively moved from left to right (Fig. 6) as the solenoid 77 (Figs. 6 and 7) is intermittently energized by the action of the pick-up winding 92 being successively influenced by the energized up or down inducers located on each side of each of the floors or landings. The action of the pick-up winding with coil 80 energized is to cause a successive movement of the contacts 62—65 from right to left (Fig. 6).

The pawl and ratchet mechanism is so constructed that a single action thereof causes each of the contacts 62—65 to move one step; for example from one side to mid position, a second action causing it to move to make contact on the other side. The cam arms 67 (Fig. 5) are set so that one contact only is in motion at any given action of the pawl and ratchet mechanism, the next action thereof following a complete motion of any one contact causing the next contact to commence to operate.

Referring now more particularly to Fig. 7, in order to avoid overburdening the diagram, only so much is shown as will render it clear how the systems shown in Figs. 5 and 6 operate. Fig. 7 shows only the right hand part of Fig. 6 and the three solenoids of Fig. 5. Thus beneath the solenoids 79a and 80a can be traced from the supply busbar 82—the switch coils 79 and 91 up, extending as far as the up limit switch 89, on the one hand, and, on the other hand the corresponding coils 80 and 91 down, to the down limit switch 90.

The switches 79 and 80 control on the one hand the selective connection of the solenoids 79a and 80a to the supply busbars 82 and on the other hand the connection of the groups of inducers 97 to a suitable alternating current source.

The ratchet solenoid 77 is energized from the supply busbars 82 through relay 21 and valve V the grid of which is pulsed with alternating current from the pick-up 92 (carried on the elevator car) each time the pick-up 92 passes an energized inducer.

The selectively operable switches or relays 91 up and 91 down when closed cause the lift to start and continue running until stopped by the opening of said switches or relays.

With the lift at rest at any given intermediate floor or landing, for example the landing associated with the push button 86 (Fig. 6), the corresponding contact 64 is in mid position, as shown, and the pick-up winding is between the two energized controlling electromagnets located on either side of that floor, that is, out of the influence of either of these two controlling electromagnets.

Now suppose it is desired to cause the lift to travel to the floor associated with push-button 84 for example. That button is momentarily pressed and a circuit is completed through coil 84a contacts 54 and 62, limit switch 89, and coil 91 up and coil 79. It will be noted that the selection of coils 91 up and 79 (as distinct from 91 down and 80) depends on the position of contact 62, which is determined by the fact that the car is at the floor associated with button 86 as will be explained.

Coil 84a causes switch 84b to close, thus removing the need for maintaining button 84 depressed. Coil 91 up causes the car to move up towards the floor associated with button 84. Coil 79 determines that successive operations of solenoid 77 (Fig. 5) shall cause contacts 62—65 to move from left to right (Fig. 6).

The car leaves the floor with which is associated push-button 88 and the pick-up winding passes the next energized coil associated with that floor. Solenoid 77 is energized and contact 64 moves to engage contact 59. Upon approaching the next floor with which press button 85 is associated the solenoid 77 is again energized and contact 63 moves to the mid position. On the lift leaving the floor with which push-button 85 is associated, the solenoid is again energized and contact 63 moves to engage contact 57. On approaching the floor (push-button 84), contact 62 leaves contact 54 and moves to mid position. This interrupts the circuit for coils 84a, 91 up and 79, and contacts 84b open, and coil 91 up being de-energized causes the lift to stop at that floor (push-button 84).

Assume now that the lift is at the floor with which push-button 86 is associated and that push-button 87 is momentarily depressed. It will be seen that coils 91 down and 80 are energized, and the lift starts in the opposite direction to that in which it previously moved, and the contacts 64 and 65 will be operated from right to left, so that on leaving the floor (push-button 86) contact 64 is moved to engage contact 58 and on approaching the next floor (push-button 87) contact 65 is moved to the mid position causing the lift to stop. It will be observed that such operations will take place for a succession of operations in sequence, the positioning of contacts 62—65, as explained, always causing the lift to travel towards and stop at the floor corresponding to the push-button which is momentarily depressed.

Referring to Fig. 8 a convenient form of controlling electromagnet for use in systems as above described comprises simply a winding 97 on a core 93 and a non-magnetic casing 94 which may be provided with suitable perforated ears 95 to permit the magnet to be readily mounted in a lift shaft. In this arrangement a convenient form for the pick-up winding comprises simply a core 96 of E-shape carrying the pick-up winding 92 on the centre limb as shown. The cores 93 and 96 may be mounted horizontally for lift control and the use of a core of E-shape for the pick-up winding permits two laterally displaced sets of controlling electromagnets to co-operate with a single pick-up winding. A second controlling electromagnet is in fact shown in dotted lines in Fig. 8. It will be obvious that the controlling electromagnets may assume other forms as may also the pick-up winding.

Referring finally to Fig. 9 there is therein shown a thermionic amplifier by means of which the currents induced in the pick-up winding such as 92 (Fig. 8) are caused to close the contacts of a relay such as 21 (Figs. 3 and 4 and the arrangement of Fig. 5). The electro-mechanical relay 21 or the solenoid has its operating coil 106 or 77 connected in the anode circuit of the power valve 107 the grid of which is coupled to an amplifying valve 108 by means of a transformer 109 and condenser 110, a resistance 111 being provided in the anode circuit of this amplifying valve the grid circuit of which is connected by means of a transformer 112 with the pick-up winding 92 through a flexible trailing lead in the case of a lift for example. The valves 107 and 108 are preferably given such a high grid bias potential that not only does no current normally flow through the valves but the operating voltages applied to the grids of the valves must be of sufficient magnitude that any stray or transient voltages picked up in the system will not cause the operation of the relay 21 or plunger 76, that is to say, the value of the grid bias is greater than is just necessary normally to cut off the anode current, by an amount which is greater than any stray or transient voltages likely to be picked up, whilst the applied operating voltage must be sufficient to cause an appreciable current to flow through the valves and sufficient to operate the relay or plunger. Since the relay 21 or plunger 76 operates on a rectified current a condenser 113 is preferably connected across the relay coil or solenoid.

It will be understood that various further modifications than those hereinbefore described may be made without departing from the scope of the invention. For example, the controlling electromagnet and the pick-up winding may be fixed close together and arranged so that there is, or there is not, interaction between them, an additional magnetic member being employed to control the magnetic circuit between them: thus pairs of controlling electromagnets and pick-up windings may be fixed in the lift shaft and the cooperating magnetic member may be carried on the lift. The controlling electromagnet may be excited with alternating or oscillating current obtained from a vibrator supplied with direct current.

It will be understood furthermore that the invention is in no way limited to the automatic retardation and stopping of lifts but may have numerous other applications involving controlling electromagnets and at least one pick-up winding governing selectively a plurality of control operations in or in connection with relatively moving objects or apparatus.

In the appended claims the terms "control apparatus" and "control operations" are intended to include signal apparatus and signal operations, whilst "alternating currents" is intended to include pulsating and similarly varying currents.

I claim:—

1. An electrical control system for use in connection with an object adapted for motion on a definite track in respect thereto with control apparatus proper having different operations for governing the motion of the object with respect to the track, comprising a group of controlling inducers, a source of periodically varying currents adapted to excite said inducers, a cooperating pick-up device adapted to have its inductive relation with said inducers changed a plurality of times in succession by reason of said pick-up device and said group of inducers passing one another during the motion of the object with respect to the track, a relay adapted to be operated a plurality of times in succession as the pick-up device is influenced by the excited inducers, said relay being adapted to effect the operations of the control apparatus proper which governs the motion of the movable object, means for causing the operations of said control apparatus proper to occur in a predetermined sequence as the pick-up device is successively influenced by the inducers, and, manually operable switching means for selectively exciting the inducers so that one or more of the several control operations as desired of the control apparatus proper can be selectively effected instead of the full sequence thereof.

2. An electrical control system for use in connection with an object adapted for motion on a definite track in respect thereto with control apparatus proper having different operations for governing the motion of the object with respect to the track, comprising a group of controlling inducers, a source of periodically varying currents adapted to excite said inducers, a cooperating pick-up device adapted to have its inductive relation with said inducers changed a plurality of times in succession by reason of said pick-up device and said group of inducers passing one another during the motion of the object with respect to the track, a relay adapted to be operated a plurality of times in succession as the pick-up device is influenced by the excited inducers, said relay being adapted to effect the operations of the control apparatus proper which governs the motion of the movable object, means for causing the operations of said control apparatus proper to occur in a predetermined sequence as the pick-up device is successively influenced by the inducers, and, switching means operable automatically in accordance with the speed of the relatively movable object for selectively exciting the inducers to obtain predetermined different sequences of operations of the control apparatus proper.

3. An electrical control system for use in connection with an object adapted for motion on a definite track in respect thereto with control apparatus proper having different operations for governing the motion of the object with respect to the track, comprising a group of controlling inducers, a source of periodically varying currents adapted to excite said inducers, a cooperating pick-up device adapted to have its inductive relation with said inducers changed a plurality of times in succession by reason of said pick-up device and said group of inducers passing one another during the motion of the object with respect to the track, a relay adapted to be operated a plurality of times in succession as the pick-up device is influenced by the excited inducers, said relay being adapted to effect the operations of the control apparatus proper which governs the motion of the movable object, means for causing the operations of said control apparatus proper to occur in a predetermined sequence as the pick-up device is successively influenced by the inducers, and, switching means operable automatically in accordance with the relative position of the relatively movable object for selectively exciting the inducers to obtain predetermined different sequences of operations of the control apparatus proper.

4. An electrical control system for use in connection with an object adapted for motion on a definite track in respect thereto with control apparatus proper having different operations for governing the motion of the object with respect to the track, comprising a group of controlling inducers, a source of periodically varying currents adapted to excite said inducers, a cooperating pick-up device adapted to have its inductive relation with said inducers changed a plurality of times in succession by reason of said pick-up device and said group of inducers passing one another during the motion of the object with respect to the track, a relay adapted to be operated a plurality of times in succession as the pick-up device is influenced by the excited inducers, said relay being adapted to effect the operations of the control apparatus proper which governs the motion of the movable object, means for causing the operations of said control apparatus proper to occur in a predetermined sequence as the pick-up device is successively influenced by the inducers, and, switching means operable automatically by the movement of the movable object for causing the operations of the control apparatus to occur in a predetermined manner.

5. An electrical control system for use in connection with an object adapted for motion on a definite track in respect thereto with control apparatus proper having different operations for governing the motion of the object with respect to the track, comprising a group of controlling inducers, a source of periodically varying currents adapted to excite said inducers, a cooperating pick-up device adapted to have its inductive relation with said inducers changed a plurality of times in succession by reason of said pick-up device and said group of inducers passing one another during the motion of the object with respect to the track, a relay adapted to be operated a plurality of times in succession as the pick-up device is influenced by the excited inducers, said relay being adapted to effect the operations of the control apparatus proper which governs the motion of the movable object, means for causing the operations of said control apparatus proper to occur in a predetermined sequence as the pick-up device is successively influenced by the inducers, and, switching means for exciting said inducers so as to stop the relative motion of the object at a predetermined relative position of the latter, manually operable means for starting the relative motion and accelerating it to a maximum and for energizing the inducers to bring the relative motion through several speed changes to zero at a predetermined relative position of the object.

6. An electrical control system for use in connection with an object adapted for motion on a definite track in respect thereto with control apparatus proper having different operations for governing the motion of the object with respect to the track, comprising a group of controlling inducers, a source of periodically varying currents adapted to excite said inducers, a cooperating pick-up device adapted to have its inductive relation with said inducers changed a plurality of times in succession by reason of said pick-up device and said group of inducers passing one another during the motion of the object with respect to the track, a relay adapted to be operated a plurality of times in succession as the pick-up device is influenced by the excited inducers, said relay being adapted to effect the operations of the control apparatus proper which governs the motion of the movable object, means for causing the operations of said control apparatus proper to occur in a predetermined sequence as the pick-up device is successively influenced by the inducers and, switching means for exciting said inducers so as to stop the relative motion of the object at a predetermined relative position of the latter, manually operable means for starting the relative motion and accelerating it through several speed stages as desired, and for energizing the inducers to bring the relative motion through several speed changes to zero at a predetermined relative position of the object.

7. An electrical control system for electrically driven objects such as lifts, track vehicles, planers and like reciprocating objects relatively movable with respect to another object such as a track or the like, comprising the combination with speed control apparatus proper adapted to perform a definite sequence of speed control operations for both acceleration and deceleration of a driving motor for one or the other of the objects, a hand controller for causing as desired any one of the speed control operations for acceleration, a relay adapted by successive operations thereof to cause said control apparatus to perform its sequence of operations for deceleration, a pick-up device carried on one of the objects for effecting the operation of said relay, a row of inducers carried on the other object so that when excited they can successively influence said pick-up device by induction during the movement thereof with respect to the row of inducers, means for exciting said inducers with low frequency supply of alternating current, and means actuated by the control apparatus proper according to its condition for selectively exciting the inducers so that whatever the speed setting of the control apparatus proper deceleration through the requisite number of stages can be automatically obtained for stopping the object in a predetermined position.

8. In an electrical control system in accordance with claim 7, means associated with the hand controller for precluding the operation of the inducers and decelerating means.

9. An electrical control system for electrically driven objects such as lifts, track vehicles, planers and like reciprocating objects relatively movable with respect to another object such as a track or the like, comprising the combination with speed control apparatus proper adapted to perform a definite sequence of speed control operations of a driving motor for one or the other of the objects, a relay adapted by successive operations thereof to cause said control apparatus to perform its sequence of operations, a pick-up device carried on one of the objects for effecting the operation of said relay, a row of inducers carried on the other object so that when excited they can successively influence said pick-up device by induction during the movement thereof with respect to the row of inducers, means for exciting said inducers from a suitable electric power source, a thermionic type amplifier having at least one grid electrode for connecting said pick-up device to said relay, and a source of potential for applying such a high grid bias that no appreciable anode current flows until the pick-up device is energized by an inducer.

10. An electrical control system for electrically driven objects such as lifts, track vehicles, planers and like reciprocating objects relatively movable with respect to another object such as a track or the like, comprising the combination with speed control apparatus proper adapted to perform a definite sequence of speed control operations of a driving motor for one or the other of the objects, a relay adapted by successive operations thereof to cause said control apparatus to perform its sequence of operations, a pick-up device carried on one of the objects for effecting the operation of said relay, a row of inducers carried on the other object so that when excited they can successively influence said pick-up device by induction during the movement thereof with respect to the row of inducers, means for exciting said inducers from a suitable electric power source, for electrically operated lifts, a selecting switching device having contacts which govern the opening of circuits which are selectively closed manually to effect a control operation at a predetermined relative position of the object, and means wherein the successive operations of the relay by the inducers and pick-up device effect successively different operations of said selecting switching device.

RONALD JOHN STEVENS.